United States Patent
Smetana et al.

(10) Patent No.: US 9,638,302 B2
(45) Date of Patent: May 2, 2017

(54) ELECTRIC AXLE WITH A TWO GEAR TRANSMISSION

(71) Applicant: Schaeffler Technologies GmbH & Co. KG, Herzogenaurach (DE)

(72) Inventors: Tomas Smetana, Herzogenaurach (DE); Philip Wurzberger, Nuremberg (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 20 days.

(21) Appl. No.: 14/406,493

(22) PCT Filed: Jul. 10, 2013

(86) PCT No.: PCT/DE2013/200038
§ 371 (c)(1),
(2) Date: Dec. 8, 2014

(87) PCT Pub. No.: WO2014/008896
PCT Pub. Date: Jan. 16, 2014

(65) Prior Publication Data
US 2015/0176687 A1    Jun. 25, 2015

(30) Foreign Application Priority Data
Jul. 13, 2012 (DE) .......................... 10 2012 212 268

(51) Int. Cl.
*F16H 3/72* (2006.01)
*F16H 37/08* (2006.01)
(Continued)

(52) U.S. Cl.
CPC ............ *F16H 37/082* (2013.01); *B60K 1/00* (2013.01); *B60K 1/02* (2013.01); *F16H 48/10* (2013.01);
(Continued)

(58) Field of Classification Search
None
See application file for complete search history.

(56) References Cited

U.S. PATENT DOCUMENTS 6,053,138 A    4/2000   Trzmiel et al.
6,098,737 A    8/2000   Aoki
(Continued)

FOREIGN PATENT DOCUMENTS

CN     1223330 A    7/1999
CN     1756915 A    4/2006
(Continued)

*Primary Examiner* — Robert A Siconolfi
*Assistant Examiner* — Ryan Dodd
(74) *Attorney, Agent, or Firm* — Davidson, Davidson & Kappel, LLC

(57) ABSTRACT

An axle drive system for a motor vehicle, having a dynamo-electric drive motor (1), a shiftable superimposing transmission having a first and a second gear stage (3, 4), a shift actuator system (5) for shifting the superimposing transmission, as well as a power divider (8) driving two output shafts (10, 12). The drive motor (1), power divider shafts (9, 11), output shafts (10, 12) and dynamoelectric drive motor (1) are arranged coaxially to each other and perpendicular to the direction of travel of the motor vehicle. A particularly compact design is achieved for the axle drive system of the aforementioned type in that the shift actuator system (5) having an electric motor (14) provided for actuation purposes is in its entirety disposed in a space bounded by the first gear stage (3) on one side and the second gear stage (4) on the other side in the axial direction of the drive system.

11 Claims, 3 Drawing Sheets

(51) Int. Cl.
  *B60K 1/00* (2006.01)
  *B60K 1/02* (2006.01)
  *F16H 63/30* (2006.01)
  *F16H 48/10* (2012.01)
  *F16H 57/02* (2012.01)
  *F16H 48/36* (2012.01)

(52) U.S. Cl.
  CPC ........... *F16H 48/36* (2013.01); *F16H 63/304* (2013.01); *B60K 2001/001* (2013.01); *B60Y 2300/82* (2013.01); *B60Y 2400/804* (2013.01); *F16H 2048/364* (2013.01); *F16H 2057/02034* (2013.01); *F16H 2063/3063* (2013.01)

(56) References Cited

U.S. PATENT DOCUMENTS

| | | |
|---|---|---|
| 2002/0152978 A1 | 10/2002 | Todo |
| 2006/0079368 A1 | 4/2006 | Hemphill et al. |
| 2006/0169502 A1* | 8/2006 | Kano ............... B60K 6/405 180/65.235 |
| 2006/0191366 A1* | 8/2006 | Kapaan ............... F16H 3/60 74/412 R |
| 2008/0264200 A1 | 10/2008 | Hoppe et al. |
| 2009/0211824 A1 | 8/2009 | Knoblauch |
| 2011/0039650 A1 | 2/2011 | Rosemeier et al. |
| 2012/0031691 A1 | 2/2012 | Fuechtner et al. |
| 2012/0058855 A1* | 3/2012 | Sten ............... F16H 48/36 475/205 |
| 2014/0235394 A1* | 8/2014 | Smetana ............... B60K 6/365 475/151 |
| 2015/0152947 A1* | 6/2015 | Smetana ............... F16H 48/36 475/5 |

FOREIGN PATENT DOCUMENTS

| | | | | |
|---|---|---|---|---|
| CN | 101331297 A | | 12/2008 | |
| DE | 10 2005 047 107 | | 4/2006 | |
| DE | 102006046419 | | 5/2008 | |
| DE | 10 2007 055 883 | | 6/2009 | |
| DE | WO2010/066532 | * | 6/2010 | ............ B60K 23/08 |
| DE | 102009029092 A1 | | 3/2011 | |
| DE | 102009029389 A1 | | 3/2011 | |
| DE | 102010036884 | | 2/2012 | |
| DE | 10 2010 036241 | | 3/2012 | |
| DE | 102010050217 | | 5/2012 | |
| DE | 202012006745 | * | 10/2012 | ............ F16H 48/06 |
| KR | 20090127493 | | 12/2009 | |
| WO | WO2004081412 A1 | | 9/2004 | |

* cited by examiner

ELECTRIC AXLE WITH A TWO GEAR TRANSMISSION

The present invention relates to an axle drive system for a motor vehicle. Such an axle drive system is used, for example, in electrically powered vehicles or in hybrid vehicles. The axle drive systems of the aforementioned type are characterized by a coaxial arrangement of a dynamoelectric drive motor provided for electric propulsion, a superimposing transmission reducing the rotational speed, and a power divider for distributing the torque generated by the drive motor to the output shafts. In an axle drive system of the above-mentioned type, the aforesaid three components have a common axis of rotation oriented transverse to the direction of travel of the motor vehicle.

BACKGROUND

An axle drive system for a motor vehicle having the features set forth in the preamble of claim 1 is known from DE102010036884A1. The coaxial design of the axle drive system and the nested arrangement of the output shafts in the rotor shaft configured as a hollow shaft enable the electric drive to be implemented in a small space.

SUMMARY OF THE INVENTION

It is an object of this invention to provide a particularly compact axle drive system for a motor vehicle having a shiftable 2-speed transmission The axle drive system according to the present invention includes firstly a dynamoelectric drive motor, in particular a permanently excited synchronous machine, having a first rotor shaft, at which there is provided a torque necessary for driving the motor vehicle. A shiftable superimposing transmission having a first and a second gear stage is connected to the drive motor on the downstream side thereof, in particular, to reduce the rotational speed of the drive motor. It is advantageous to provide for speed reduction, because for the same power output, a high-speed electric machine has a smaller shaft height than a low-speed electric machine with a correspondingly higher torque.

The axle drive system further includes a shift actuator system having an axially movable shifting sleeve for shifting the two gears. The superimposing transmission has a transmission input shaft which is non-rotatably connected to the first rotor shaft of the drive motor and may be operatively connected via the aforesaid shifting sleeve to the second gear stage, either directly or, alternatively, indirectly through the first gear stage. The transmission input shaft is connected to the first rotor shaft, for example, via spline teeth allowing the two shafts to move relative to each other in the axial direction, and thereby compensating for tolerances. In addition, the spline teeth allow any vibrations which may be excited in the transmission to be decoupled from the dynamoelectric machine.

A power divider is connected to the superimposing transmission on the downstream side thereof, the power divider having a first power divider shaft driving a first output shaft and a second power divider shaft driving a second output shaft. The aforesaid power divider or differential enables different rotational speeds on the left and right output sides.

The axle drive system according to the present invention is characterized by a coaxial configuration. This means that the power divider shafts, the output shafts, and the first rotor shaft are rotatably arranged about a common axis of rotation oriented transverse to the direction of travel of the motor vehicle.

In accordance with the present invention, a particularly compact design is achieved for the axle drive system in that the shift actuator system includes an electric motor for moving the shifting sleeve, and in that the shift actuator system is disposed in a space bounded by the first gear stage on one side and the second gear stage on the other side in the axial direction of the drive system. Thus, the entire shift actuator system is disposed axially between the two shiftable gear stages of the superimposing transmission. Also, considered in the axial direction, the extent of the electric motor used for moving the shifting sleeve does not exceed the axial spacing between the first and second gear stages.

In an advantageous embodiment of the present invention, the spacing between the first and second gear stages can be kept particularly small using this concept because the electric motor has a second rotor shaft oriented transverse to the common axis of rotation, and because the shift actuator system includes means for converting a rotational movement of the second rotor shaft into a translational movement of the shifting sleeve in the axial direction. The torque generated by the second rotor shaft oriented perpendicular to the axis of rotation is transferred, for example, via a suitable angle drive, to a shaft oriented parallel to the common axis of rotation, from where the rotary motion must finally be converted into a translational motion of the shifting sleeve.

In an advantageous embodiment of the present invention, the aforesaid means include a ball screw and nut drive. If, in accordance with a further advantageous embodiment of the present invention, the second rotor shaft is configured as a pinion shaft and the ball screw includes crown teeth in operative engagement with the pinion shaft, then the electric motor can bring about an axial movement of the ball screw.

The aforesaid means may further include a pivoted rocker member for converting an axial movement of the ball screw into the translational movement of the shifting sleeve in the axial direction.

The entire shift actuator system including the electric motor with its pinion shaft, the ball screw with the crown teeth, the rocker member, as well as the shifting sleeve in operative engagement therewith, is disposed in the axial space bounded by the first gear stage on one side and the second gear stage on the other side.

In another advantageous embodiment of the present invention, the space required for the axle drive system may be further reduced by arranging the first gear stage in a space radially bounded by end turns of a stator of the drive motor in such a way that it is immediately adjacent to an end face of a rotor of the dynamoelectric machine and that it does not extend axially beyond the aforesaid end turns. Thus, the existence of the first gear stage does not increase the overall axial length of the axle drive system, because the space occupied by the first gear stage is not larger than the axial space occupied by the end turns of the stator anyway.

Advantageously, the first and second gear stages are configured as planetary gear sets, the second gear stage having an output shaft non-rotatably coupled to an input shaft of the power divider.

In a further advantageous embodiment of the present invention, the superimposing transmission may be separated from the drive motor in that the first gear stage of the superimposing transmission is separated by an end shield from the drive motor within an axle drive housing, and in that the end shield has a bearing point for supporting the first rotor shaft and a further bearing point for supporting the transmission input shaft. The first rotor shaft and the transmission input shaft are supported radially independently of each other, so that vibrations in the transmission input shaft are not transmitted to the first rotor shaft.

The axle drive system advantageously includes a first angular contact ball bearing for radially supporting a planet carrier of the first gear stage, while a second angular contact ball bearing is provided for radially supporting a sun gear of the second gear stage, the two angular contact ball bearings being axially preloaded.

In a further advantageous embodiment of the present invention, the axle drive system features a torque-vectoring unit for selectively distributing a torque introduced by the drive motor to the output shafts, the torque-vectoring unit having a torque-vectoring electric motor and a planetary gear unit having two planetary gear sets.

The power divider is advantageously configured as a planetary differential, the first power divider shaft being a planet carrier of the power divider, the second power divider shaft being non-rotatably connected to a sun gear of the planetary differential, and the torque-vectoring electric motor being in operative engagement via a spur gear stage with the sun gear of a planetary gear set of the planetary gear unit, whose ring gear is non-rotatably connected to the planet carrier of the power divider.

The torque-vectoring electric motor advantageously has a third rotor shaft oriented parallel to the axis of the first rotor shaft.

The rotational speed of the torque-vectoring electric motor is reduced by the spur gear stage and the planetary gear unit, so that, for purposes of selective torque distribution, a high adjusting torque can be applied to the power divider using a relatively small electric motor.

In another advantageous embodiment, the entire transmission unit, including the superimposing transmission, the power divider and the planetary gear unit of the torque-vectoring unit, is axially preloaded by axial bearings, the axial bearings all having the same pitch circle, and the aforesaid transmission unit being clamped between the drive motor and the torque-vectoring electric motor in the axial direction. Considered from left to right, the configuration of the electric axle drive unit begins, for example, with the drive motor, followed by the first gear stage of the planetary gear unit, followed by the shift actuator system, followed by the second gear stage of the planetary gear unit, followed by the power divider, followed by the planetary gear unit, finally followed by the spur gear stage which is in operative engagement with the third rotor shaft of the torque-vectoring electric motor.

BRIEF DESCRIPTION OF THE DRAWINGS

The present invention will now be further illustrated with reference to the exemplary embodiments shown in the drawings, in which.

DETAILED DESCRIPTION

Figure 1:
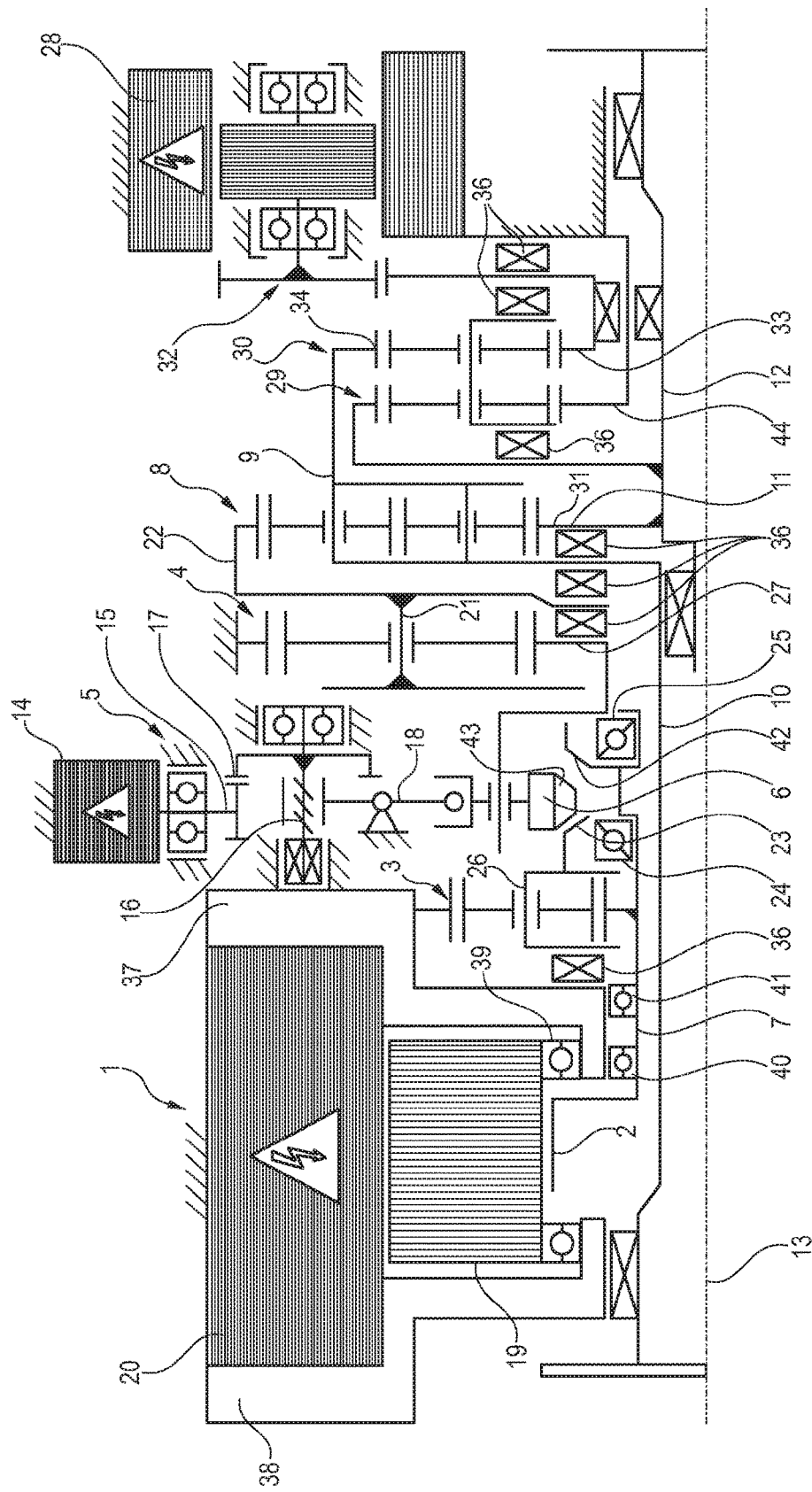
FIG. 1 shows an embodiment of the axle drive system according to the present invention in a neutral state.

FIG. 1 shows an embodiment of the axle drive system according to the present invention in a neutral state. The system includes a drive motor 1, which is configured as a permanently excited synchronous machine and has a stator 20 and a rotor 19 driving a first rotor shaft 2 configured as a hollow shaft. A first output shaft 10, which drives a wheel of the axle to be driven, extends within first rotor shaft 2. First rotor shaft 2 is connected via spline teeth (not shown) to a transmission input shaft 7 of a superimposing transmission including a first and a second gear stage 3, 4. The two gear stages 3, 4 are configured as planetary stages. The first planetary stage bears axially against an end shield 37 of the drive motor via an axial bearing 36, whereas the opposite end shield 38 provides radial support for output shaft 10. Moreover, at the aforesaid end shield 37, first rotor shaft 2 is supported at a bearing point by a rolling element bearing 39. Located approximately opposite on the other side of end shield 37, as viewed in a radial direction, is a further bearing point, where transmission input shaft 7 is radially supported by rolling element bearings 40, 41.

A planet carrier 26 of first gear stage 3 constitutes the output shaft thereof. Located between first and second gear stages 3, 4 is a shift actuator system 5 via which planet carrier 26 may be optionally coupled to a sun gear 27 of second gear stage 4. Shift actuator system 5 and first and second gear stages 3, 4 together form a shiftable 2-speed transmission. Shift actuator system 5 makes it possible to implement two different gear ratios and a neutral position.

The clutch system of the two 2-speed transmission is made up of sets clutch teeth 23, 42, one or more synchronizer rings 43, as well as a shifting sleeve 6. The coupling body of shifting sleeve 6 is interlockingly connected to sun gear 27 of second gear stage 4 via axially movable spline shaft teeth.

The axial movement of shifting sleeve 6 is initiated by a pivoted rocker member 18. The slider blocks of shifting sleeve 6 engage in a groove extending around the outer periphery of shifting sleeve 6. A pivoting movement of rocker member 18 is caused by a ball-screw drive having a ball screw 16. Ball screw 16 is driven by crown teeth 17 of a second rotor shaft 15, which is configured as a pinion shaft. Second rotor shaft 15 of electric motor 14 is perpendicular to first rotor shaft 2, and thus parallel to the direction of travel of the motor vehicle. By installing electric motor 14 longitudinally in the direction of travel, it is possible to configure the entire shift actuator system to have a small axial extent. The entire shift actuator system 5 is located in a space bounded by first gear stage 3 on the left side and second gear stage 4 on the right side. The axial space requirement of the axle drive system is further minimized by disposing the first planetary gear set of first gear stage 3 in a neutral space below the end turns of drive motor 1. Thus, the right side of planet carrier 26 of first gear stage 3 is flush with end shield 37 of drive motor 1.

Furthermore, angular contact ball bearings 24, 25 are provided for supporting planet carrier 26 of first gear stage 3 and sun gear 27 of second gear stage 4. The aforesaid angular contact ball bearings 24, 25 are axially preloaded.

In FIG. 1, the 2-speed transmission is shown in a neutral state. Sun gear 27 of second gear stage 4 is not drivingly coupled to drive motor 1 in any way, because shifting sleeve 6 is neither in gear tooth engagement with the left set 23 nor the right set 42 of clutch teeth. In this condition, advantageously, neither drive motor 1 nor first gear stage 3 is drivingly coupled to any of the two output shafts 10, 12, so that no drag losses occur in these components.

The flow of torque in the first and second gears will be explained in more detail in connection with FIGS. 2 and 3.

Output shaft 21 of second gear stage 4, which is also configured as a planetary gear set, is formed by the planet carrier thereof, which is non-rotatably coupled to an input shaft 22 of a power divider 8. Power divider 8 is configured as a planetary differential, whose ring gear is formed by input shaft 22. A first power divider shaft 9 has the function of a planet carrier and drives first output shaft 10. A sun gear 31 of the planetary differential is, in turn, non-rotatably coupled to second output shaft 12.

Located to the right of and adjacent to power divider 8 is a torque-vectoring unit having a planetary gear unit including two planetary gear sets 29, 30, a spur gear stage 32, and a torque-vectoring electric motor 28 in fixed driving connection with the latter. Torque-vectoring electric motor 28 drives a sun gear 33 of planetary gear set 30 via spur gear stage 32. Ring gear 34 of planetary gear set 30 is coupled to first power divider shaft 9. Planetary gear set 29 of the planetary gear unit includes a sun gear 44 attached to the housing.

Thus, the torque generated by drive motor 1 is superimposed with a torque of torque-vectoring electric motor 28, which is transmitted to the wheels of the vehicle via output shafts 10, 12, which are configured as stub shafts. The entire transmission unit, including the planetary gear unit (including shift actuator system 5), power divider 8, and the planetary gear unit of the torque-vectoring unit, is axially preloaded by axial bearings 36. The axial bearings 36 disposed in the region of the planetary gear unit are located on the same pitch circle. Similarly, the remaining axial bearings 36 are located on another common pitch circle, whose radius is smaller than that of the axial bearings 36 in the region of the planetary gear unit. Alternatively, all axial bearings 36 may be disposed on a single common pitch circle to be able to reliably accommodate tilting moments.

The operation of the 2-speed transmission will now be explained in greater detail with reference to FIGS. 2 and 3.

Figure 2:
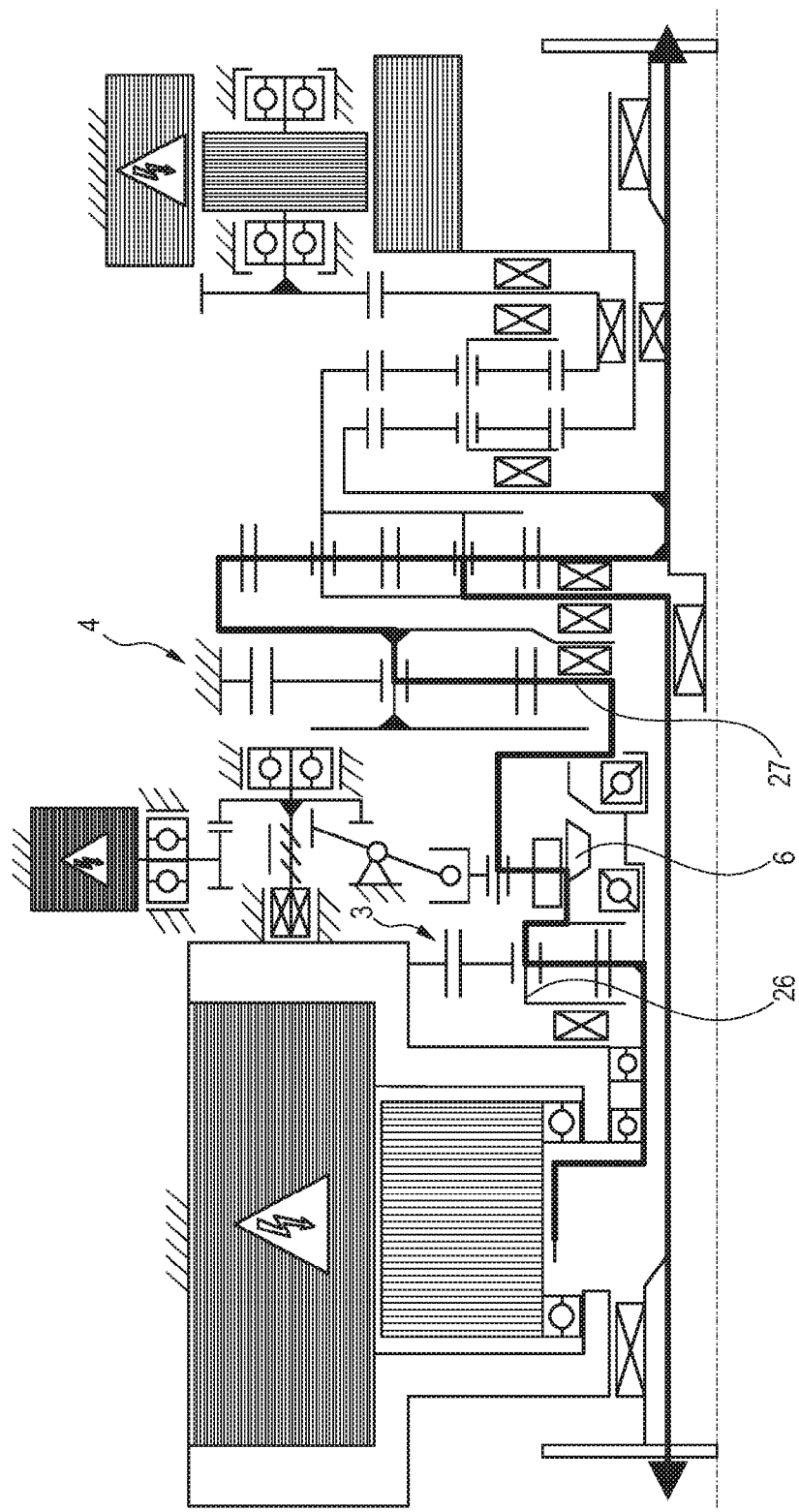
FIG. 2 shows the embodiment of FIG. 1 in a first gear.

FIG. 2 shows the embodiment of FIG. 1 in the first gear.

Shifting sleeve 6 is in operative engagement with the left set of clutch teeth 23. Consequently, planet carrier 26 of first gear stage 3 is drivingly connected to sun gear 27 of second gear stage 4. Thus, the resulting gear ratio of the drive system is obtained from the series connection of first and second gear stages 3, 4. The flow of torque is indicated by the bold line.

Figure 3:
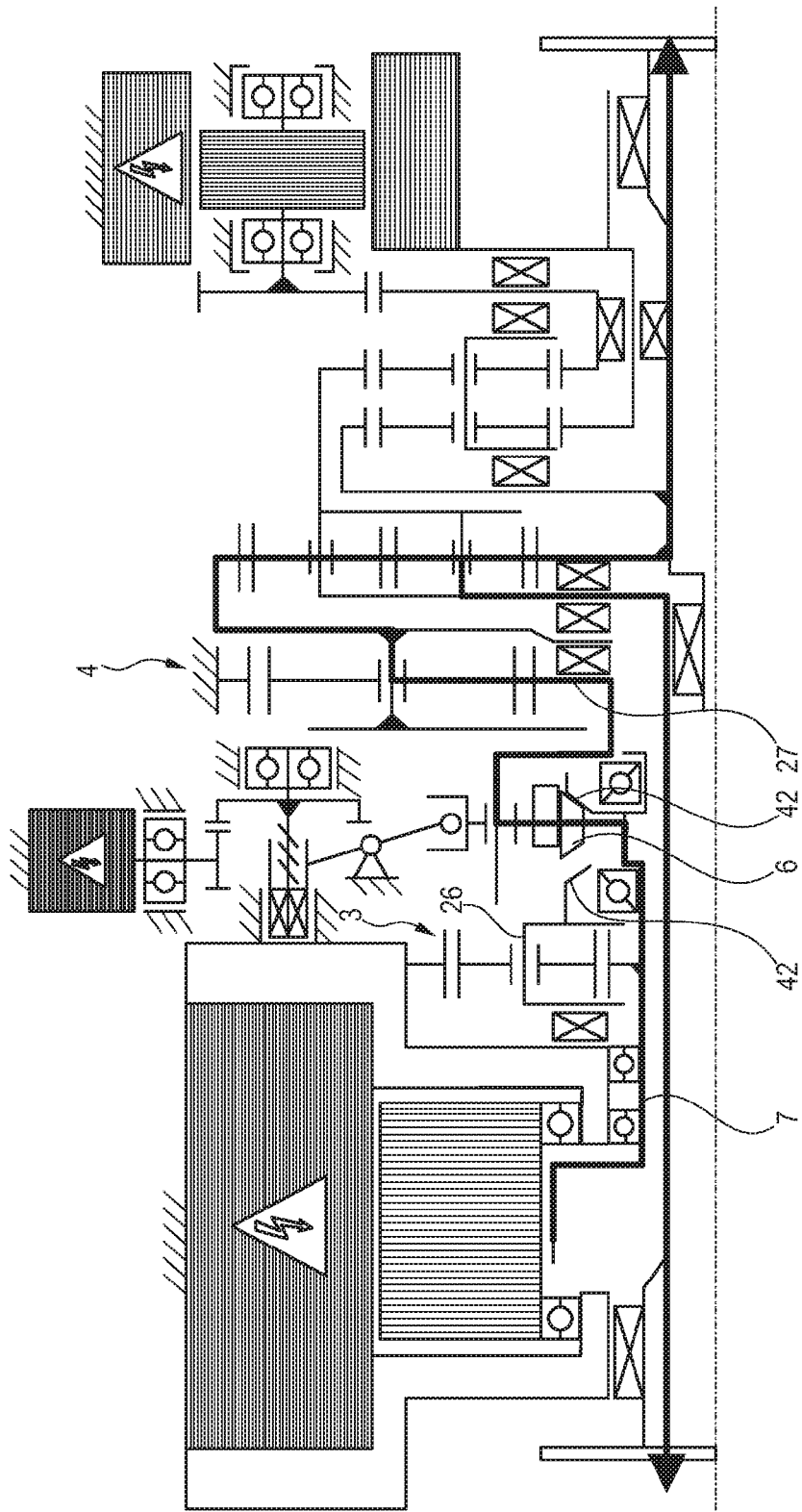
FIG. 3 shows the embodiment of FIG. 1 in a second gear.

FIG. 3 shows the embodiment of FIG. 1 in the second gear. Here, shifting sleeve 6 is in operative engagement with the right set of clutch teeth 42, so that planet carrier 26 of first gear stage 3 is decoupled from second gear stage 4. Transmission input shaft 7 is now in direct operative engagement with sun gear 27 of second gear stage 4. Thus, compared to the first gear setting, a smaller speed reduction ratio is obtained for drive motor 1.

LIST OF REFERENCE NUMERALS 1 drive motor
2 first rotor shaft
3 first gear stage
4 second gear stage
5 shift actuator system
6 shifting sleeve
7 transmission input shaft
8 power divider
9 first power divider shaft
10 first output shaft
11 second power divider shaft
12 second output shaft
13 axis of rotation
14 electric motor
15 second rotor shaft
16 ball screw
17 crown teeth
18 rocker member
19 rotor
20 stator
21 output shaft of the second gear stage
22 input shaft of the power divider
23 set of clutch teeth
24 first angular contact ball bearing
25 second angular contact ball bearing
26 planet carrier of the first gear stage
27 sun gear of the second gear stage
28 torque-vectoring electric motor
29, 30 planetary gear set
31 sun gear of the planetary differential
32 spur gear stage
33 sun gear of a planetary gear set of the planetary gear unit
34 ring gear of a planetary gear set of the planetary gear unit
35 third rotor shaft
36 axial bearing
37, 38 end shield
39, 40, 41 rolling element bearing
42 set of clutch teeth
43 synchronizer ring
44 sun gear attached to the housing

What is claimed is:

1. An axle drive system for a motor vehicle, comprising:
a dynamoelectric drive motor having a first rotor shaft;
a shiftable superimposing transmission having a first and a second gear stage;
a shift actuator system having an axially movable shifting sleeve for shifting the two gear stages, the superimposing transmission having a transmission input shaft non-rotatably connected to the first rotor shaft of the drive motor and operatively connectable via the shifting sleeve to the second gear stage through the first gear stage, and
a power divider having a first power divider shaft driving a first output shaft and a second power divider shaft driving a second output shaft, the first and second power divider shafts, the first and second output shafts, and the first rotor shaft being rotatably arranged about a common axis of rotation oriented transverse to a direction of travel of the motor vehicle,
the shift actuator system including an electric motor for moving the shifting sleeve and disposed in a space bounded in the axial direction by the first gear stage on a first side and the second gear stage on a second side of the drive system;
wherein the power divider is configured as a planetary differential, the first power divider shaft is a planet carrier of the power divider, the second power divider shaft is non-rotatably connected to a sun gear of the planetary differential.

2. The axle drive system as recited in claim 1 wherein the electric motor has a second rotor shaft oriented transverse to said common axis of rotation, and wherein the shift actuator system includes a converter for converting a rotational movement of the second rotor shaft into a translational movement of the shifting sleeve in the axial direction.

3. The axle drive system as recited in claim 2 wherein said converter includes a ball screw and nut drive.

4. The axle drive system as recited in claim 3 wherein the second rotor shaft is configured as a pinion shaft and the ball screw includes crown teeth in operative engagement with the pinion shaft.

5. The axle drive system as recited in claim 3 wherein said converter further includes a pivoted rocker member for converting an axial movement of the ball screw into the translational movement of the shifting sleeve in the axial direction.

6. The axle drive system as recited in claim 1 wherein the first gear stage is disposed in a space radially bounded by end turns of a stator of the drive motor in such a way that it does not extend axially beyond said end turns.

7. The axle drive system as recited in claim 1 wherein the first and second gear stages are configured as planetary gear sets, and the second gear stage has an output shaft non-rotatably coupled to an input shaft of the power divider.

8. The axle drive system as recited in claim 1 wherein the first gear stage of the superimposing transmission is separated by an end shield from the drive motor, and wherein the end shield has a bearing point for supporting the first rotor shaft and a further bearing point for supporting the transmission input shaft.

9. The axle drive system as recited in claim 1 further comprising a first angular contact ball bearing for radially supporting a planet carrier of the first gear stage, and a second angular contact ball bearing for radially supporting a sun gear of the second gear stage, the two angular contact ball bearings being axially preloaded.

10. The axle drive system as recited in claim 1 further comprising a torque-vectoring unit for selectively distributing a torque introduced by the drive motor to the output shafts, the torque-vectoring unit having a torque-vectoring electric motor and a planetary gear unit having two planetary gear sets.

11. The axle drive system as recited in claim 10 wherein the torque-vectoring electric motor has a third rotor shaft oriented parallel to the axis of the first rotor shaft.

* * * * *